United States Patent [19]

Bahlmann et al.

[11] Patent Number: 5,495,372
[45] Date of Patent: Feb. 27, 1996

[54] MOTOR DRIVE CIRCUIT WITH EMERGENCY AUXILIARY POWER SUPPLY ENERGIZED BY MOTOR

[75] Inventors: Johannes P. M. Bahlmann; Henricus M. van Hout, both of Eindhoven, Netherlands

[73] Assignee: U.S. Philips Corporation, New York, N.Y.

[21] Appl. No.: 148,111

[22] Filed: Nov. 4, 1993

[30] Foreign Application Priority Data

Nov. 17, 1992 [EP] European Pat. Off. .............. 92203514

[51] Int. Cl.$^6$ .................................................. G11B 21/02
[52] U.S. Cl. .............................. 360/75; 318/560
[58] Field of Search ................. 360/75, 105, 69; 318/563, 687, 375, 560; 307/64

[56] References Cited

U.S. PATENT DOCUMENTS

| | | | |
|---|---|---|---|
| 4,371,903 | 2/1983 | Lewis | 360/75 |
| 4,786,995 | 11/1988 | Stupeck et al. | 360/75 |

FOREIGN PATENT DOCUMENTS

| | | |
|---|---|---|
| 0224378 | 6/1987 | European Pat. Off. . |
| 0301737 | 2/1989 | European Pat. Off. . |
| 2121589 | 12/1982 | United Kingdom . |

Primary Examiner—W. R. Young
Assistant Examiner—Varsha A. Kapadia
Attorney, Agent, or Firm—Edward Blocker; Bernard Franzblau

[57] ABSTRACT

A motor drive circuit for driving an electromotor having a permanent magnet rotor and a stator comprising one or more stator windings. When the supply voltage of the motor drive circuit fails, an emergency signal is generated by a signal generator. This emergency control signal activates an auxiliary power supply circuit for extracting electric energy from the motor and supplying the extracted energy to an auxiliary circuit. The auxiliary power supply circuit comprises a rectifier circuit formed by the fly back diodes bridging the switches of an electronic commutation circuit. The drive circuit comprises short-circuit switches bridging the stator windings. In response to the emergency control signal a short-circuit apparatus causes the stator windings to be temporarily intermittently short-circuited. As a result, a capacitor is charged. The energy stored in the capacitor is used for temporarily energizing the auxiliary circuit once the power supply to the drive circuit has failed. If the drive circuit is used with a hard disc drive, the energy supplied by the auxiliary power supply circuit can be used for moving the magnetic head to an idle position.

20 Claims, 1 Drawing Sheet

MOTOR DRIVE CIRCUIT WITH EMERGENCY AUXILIARY POWER SUPPLY ENERGIZED BY MOTOR

BACKGROUND OF THE INVENTION

This invention relates to a motor drive circuit for driving an electromotor with a permanent magnet rotor and a stator comprising one or more stator windings, the motor drive circuit comprising an excitation circuit for exciting the stator windings, a signal generation circuit for generating an emergency control signal which indicates a failure of the excitation of the stator windings, and an auxiliary power supply circuit for extracting electric energy from the motor in response to the emergency control signal and supplying the extracted energy to an auxiliary circuit, the auxiliary power supply circuit comprising a rectifier circuit inserted between at least one stator winding and the auxiliary circuit.

The invention further relates to a data reading and/or recording apparatus comprising a motor for driving in a rotating fashion a disc having a recording layer, a read/write head arranged opposite the recording layer and movable in a radial direction relative to the disc, an actuator for moving the head and a positioning control means for energizing the actuator, and a motor drive circuit as defined in the opening paragraph. The positioning control means is coupled to the auxiliary power supply circuit for its energy supply. The positioning control means is arranged to cause the magnetic head to be moved to an idle position in response to the emergency control signal.

A motor drive circuit of this type as well as data read and/or recording (apparatus in the form of a so-called magnetic hard disc drive are known, for example, from U.S. Pat No. 4,371,903.

The use of a motor drive circuit of the type defined in the opening paragraph is especially interesting for use with magnetic hard disc drives. With these hard disc drives an air cushion is developed between the read/write head and the disc as a result of the high speed of rotation of the disc, thus avoiding mechanical contact between the head and the disc. If the drive motor is de-energized as a result of a power failure, the r.p.m. of the motor and thus the speed of rotation of the disc is reduced. In order to prevent the head from contacting the disc when the motor is de-energized, the head is moved to an idle position by an electrically driven actuator before the disc speed has dropped below the critical value. The required electric power is extracted from the drive motor which is used as a generator in the case of a power failure.

Generally, the motor drive circuit and the logic circuits preferably have the same supply voltage. For reducing heat dissipation in the logic circuits, low voltages of the order of several volts are preferably chosen for the power supply of the logic circuits. If the motor used is also designed for these low voltages, the problem will occur that the voltage generated by the motor while acting as a generator is too low for the actuator to be energized for moving the head because the generated voltage is only several volts. The useful voltage, however, is even considerably less as a result of the relatively large voltage drop across the diodes included in the rectifier circuit. It is an object of the invention to provide a motor drive circuit by which electric energy having a considerably higher voltage level can be extracted from the motor once the motor has been de-energized.

SUMMARY OF THE INVENTION

According to the invention this object is achieved by means of a motor drive circuit as defined in the opening paragraph, characterized in that the drive circuit comprises a short-circuit means for short-circuiting at least one stator windingcoupled to the rectifier circuit, and a control means coupled to the short-circuit means for causing the stator winding(s) coupled to the rectifier circuit to be temporarily intermittently short-circuited.

As a result of the stator windings being short-circuited, the current in the stator winding will increase to a relatively large value. The moment the short-circuit state is terminated, a large voltage will be induced in the stator winding as a result of the available self-inductance.

BRIEF DESCRIPTION OF THE DRAWINGS

The invention will be further explained hereinafter with reference to the drawing, in which.

DESCRIPTION OF THE PREFERRED EMBODIMENTS

Figure 1:
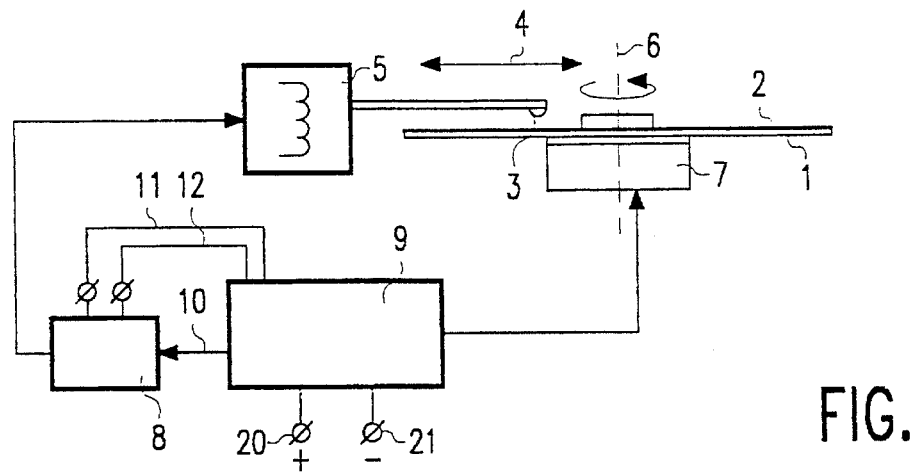
FIG. 1 shows an embodiment of a reading and recording apparatus according to the invention.

FIG. 1 shows an embodiment of a data reading and recording apparatus. The apparatus shown relates to what is commonly referred to as a magnetic hard disc drive. The apparatus comprises a disc 1 to be rotated by a motor 7. The disc 1 is covered by a magnetic recording layer 2. Data may be customarily written on and read off of the magnetic layer 2 by means of a magnetic head 3 which is radially movable in relation to the disc in a direction indicated by an arrow 4. When the head 3 is moved, it is driven with the aid of an actuator 5. The actuator 5 is controlled by an auxiliary circuit which in this case is a positioning control means 8 of a customary type for controlling the actuator 5 in response to an emergency control signal. As a result the head 3 is moved to an idle position in which it is incapable of contacting the recording layer 2.

The emergency control signal is usually generated when there is a power failure of the motor 7. As a result, the r.p.m. of the disc will drop. With a falling r.p.m. of the disc 1 the air cushion between the rotating disc 1 and the head 3 can no longer be maintained. By moving the head to the idle position when there is a power failure of the motor, the head 3 is prevented from contacting the recording layer and, as a result, damaging the layer and itself.

For a detailed description of the positioning control means as well as generation of the emergency control signal, reference may be made, for example, to EP-A 0 224 378, GB-A 2 121 589 and U.S. Pat. No. 4,371,903, which documents are considered to be incorporated in the description by reference.

The motor 7 is a permanent magnet DC motor which drives the disc 1 rotating around an axis 6. Such a motor comprises a permanent magnet rotor and a stator having one or more stator windings. The motor 7 is energized by a motor drive circuit 9. In addition, the motor drive circuit 9 generates the emergency control signal and applies same through a signal line 10 to the positioning control means 8. Furthermore, the positioning control means 8 is energized from the motor drive circuit 9 through the supply lines 11 and 12.

Figure 2:
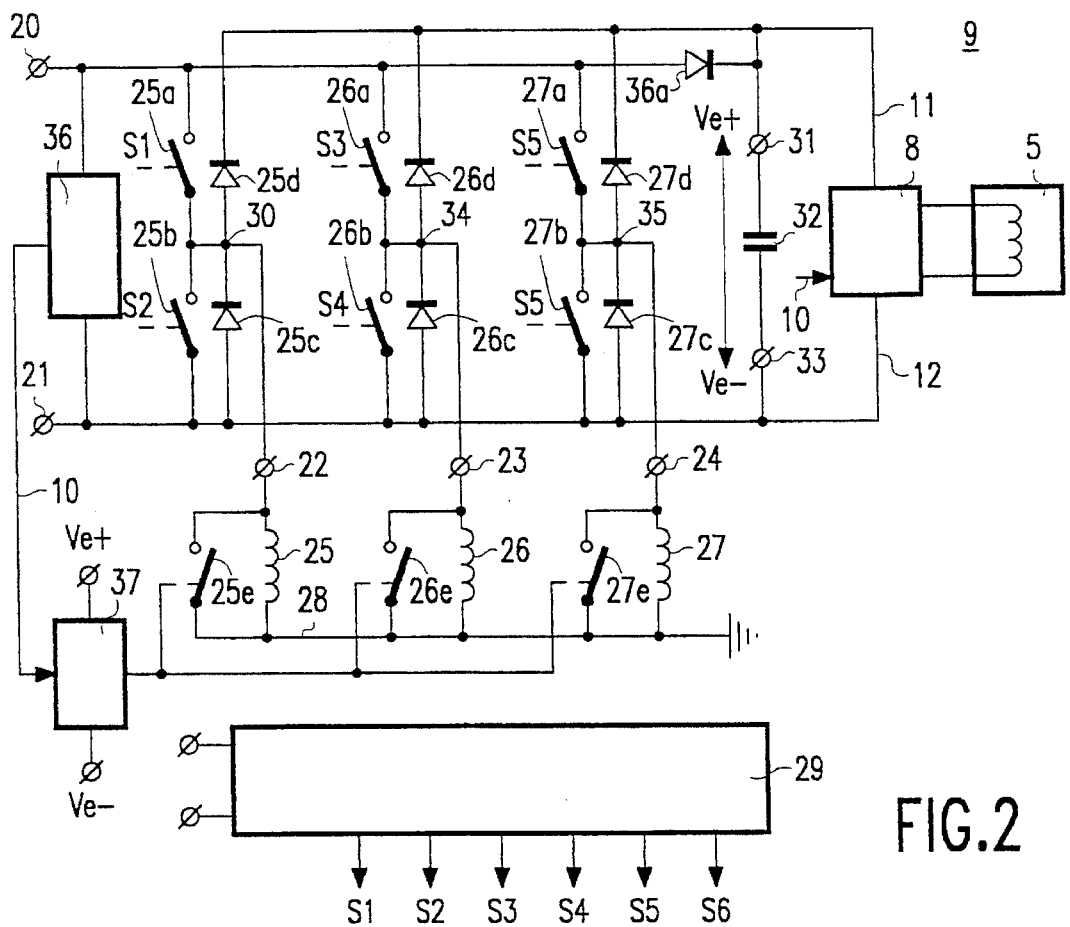
FIG. 2 shows an embodiment of the motor drive circuit according to the invention.

FIG. 2 provides a detailed representation of an embodiment of the motor drive circuit 9. The motor drive circuit 9 comprises a positive supply terminal 20 and a negative supply terminal 21 which are to be connected to a DC voltage source for feeding the motor drive circuit. The motor drive circuit 9 further includes three output terminals 22, 23 and 24 connected to stator windings 25, 26 and 27 respectively, in a star configuration, of motor 7. The star point of the stator windings is denoted by a reference numeral 28 and preferably is connected to ground potential. The stator winding 25 can be connected to the positive supply terminal 20 by an electronic switch 25a and to the negative supply terminal 21 by an electronic switch 25b. The stator winding 26 can be connected to the positive supply terminal 20 by an electronic switch 26a and to the negative supply terminal 21 by an electronic switch 26b. The stator winding 27 can be connected to the positive supply terminal 20 by an electronic switch 27a and to the negative supply terminal 21 by an electronic switch 27b. The switches 25a, 25b, 26a, 26b, 27a and 27b are rendered conductive and are shut off by a commutation circuit 29 generating the required control signals S1, . . ., S6. The commutation circuit 29 is of a customary type operating the switches according to a cyclic pattern, in which the stator windings are energized with currents that generate a magnetic field of rotation as a result of which a rotary movement of the permanent magnet rotor is effected. The commutation instants may be determined depending on the rotor position as is customary in brushless DC motors. The rotor position may then be determined with the aid of magnetic sensors installed along the rotating rotor. The rotor position may also be determined on the basis of the counter-electromotive force induced in the stator windings by the rotor. The commutation instants may also be independent of the rotor position as is customary in synchronous motors. The switches 25b, 26b and 27b are bridged by what is commonly referred to as fly back diodes 25c, 26c and 27c. A junction 30 between these switches 25a and 25b is connected via a fly back diode 25d to a terminal 31 of a capacitor 32. Another terminal 33 of the capacitor 32 is connected to the negative supply terminal 21. A junction 34 between the switches 26a and 26b is also connected to the terminal 31 via a fly back diode 26d. A junction 35 between the switches 27a and 27b is also connected to the terminal 31 via a fly back diode 27d. Furthermore, the positive supply terminal 20 is connected to the terminal 31 via a diode 36a.

The terminals 31 and 33 are further connected to the respective power supply lines 11 and 12 for supplying electrical energy to the positioning control means 8.

The motor drive circuit according to the invention comprises a short-circuit means for short-circuiting at least one of the stator windings of the motor. In the embodiment shown in FIG. 2 the short-circuit means comprises three electronic switches 25e, 26e and 27e which are connected between the terminals 22, 23 and 24 respectively, and the star point 28 connected to ground potential, and thus bridge the respective stator windings 25, 26 and 27.

In response to the emergency control signal, the short-circuit means 37 alternately causes the switches 25e, 26e and 27e to open and close for temporarily intermittently short-circuiting the stator windings 25, 26 and 27. The short-circuit means 37 may comprise, for example, an oscillator of a customary type producing, when activated, a binary periodic output signal.

For generating the emergency control signal, the motor drive circuit comprises a signal generator 36 which produces a signal when there is a power failure of the motor 7. Such a circuit may comprise, for example, a voltage detector of a customary type connected to the supply terminals 20 and 21 which detects whether the supply voltage has dropped below a specific minimum level.

The operation of the circuit is as follows. During normal operation the motor drive circuit is fed through the power supply terminals 20 and 21. The stator windings 25, 26 and 27 are alternately connected to the power supply terminals 20 and 21 in a cyclic switch pattern. As a result, the stator windings are supplied with AC currents driving the motor 7 and, consequently, the disc 1.

The positioning control means 8 receives its supply voltage via the diode 36a. The moment the stator windings 25, 26 and 27 are de-energized as a result of a failure of the supply voltage between the supply terminals 20 and 21, the signal generator 36 will generate the emergency control signal.

This emergency control signal is applied to the positioning control means 8 which, in response thereto, energizes the actuator 5 so that the latter moves the head 3 in the direction of the idle position. In addition, the short-circuit means also receives the emergency control signal and will be activated thereby. During this operation the switches 25e, 26e and 27e are alternately opened and closed. In the closed position the stator windings 25, 26 and 27 are short-circuited. Since the still rotating permanent magnet rotor generates inductance voltages in the stator windings 25, 26 and 27, the current in the stator windings will increase up to the moment when the situation of short-circuiting is interrupted again. After the interruption the current flowing in the stator winding will be maintained as a result of the self-inductance of the stator windings. These currents charge the capacitor 32 via the dimes 25c, 25d, 26c, 26d, 27c and 27d. For that matter, said diodes form a so-called three-phase rectifier inserted between the terminals 22, 23 and 24 and the capacitor 32. When the capacitor 32 is being charged, the current will gradually diminish until the stator windings in a next period of short-circuit are short-circuited again and the currents will increase again. By thus alternately short-circuiting the stator windings and interrupting this condition, the kinetic energy available in the motor and disc is converted into electric energy and supplied to the capacitor 32. Since the power supply lines of the positioning control means 8 are connected to the terminals 31 and 33 of the capacitor 32, the power supply to the positioning control means is maintained after the supply voltage between the voltage terminals has dropped during the running period out of the motor 7. This period of time is sufficient to move head 3 to the idle position.

Though not necessary, it is preferable to control the voltage across the capacitor 32 to a constant value. This may be effected in a simple manner by making the switch pattern of the switches 25e, 26e and 27e depend on the voltage level across the capacitor. For example, it is possible to adjust the ratio between the time intervals in which the stator windings are short-circuited and the time intervals in which the short-circuit condition is interrupted. Another option is to deactivate the short-circuit means and thereby interrupt the short-circuiting of the stator coils once a specific upper limit R1 has been reached by the voltage across the terminals 31 and 33, until the voltage across the capacitor 32 has diminished below a lower limit R2. When the lower limit is reached, the short-circuit means 37 is re-activated after which the short-circuit condition is alternately caused to occur and be interrupted.

Figure 3:
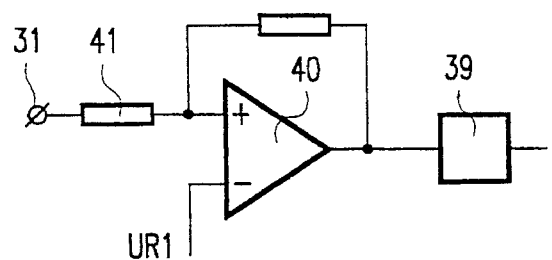
FIG. 3 shows a circuit to be used in the motor drive circuit shown in FIG. 2.

FIG. 3 shows by way of example a circuit for activating and deactivating the short-circuit means 37.

The circuit shown comprises a so-called feedforward comparator circuit formed by an operational amplifier 40 whose inverting input is connected to a reference voltage UR1. The non-inverting input is connected to the terminal 31 through a :resistor 41 and to the output of the operational amplifier 40 through a resistor 42. The output signal of the operational amplifier 40 may be used as a control signal for activating and deactivating the short-circuit means.

The power supply to short-circuit means 37 and to the operational amplifier 40 is to be maintained when the power supply on the supply terminals 20 and 21 fails. Therefore, the power supply is to be provided by a separate power supply circuit. The circuit 37 as well as the amplifier 40 are preferably supplied through the terminals 31 and 33.

It should be observed that the invention is not restricted to the embodiments described hereinbefore. For example, it is possible to provide a short-circuit switch for a part of the stator windings in lieu of all the stator windings. Alternatively, in lieu of bridging the stator windings by means of the short-circuit switch, it is possible to insert the short-circuit switch between the terminals of the motor (in the embodiment shown in FIG. 2 they are the terminals 22, 23 and 24).

Neither is it necessary, for that matter, that all of the short-circuit switches be closed simultaneously. It is also possible to operate the short-circuit switches in an alternating fashion.

It should further be observed that the invention is not restricted to multiphase motors, but that the invention is likewise applicable to single-phase motors.

In addition, it should be observed that, basically, the switches 25a, 25b, 26a, 26b, 27a and 27b may also be used for temporarily short-circuiting the stator windings. However, this is disadvantageous in that these switches are adapted for switching high currents. Operating such switches for high currents requires relatively much electric power. This is contrasted with separate switches 25e, 26e and 27e which only need to be activated in the case where the motor is operated as a generator and where, compared with normal motor operation, only small currents need to be switched.

Since it is desirable to conserve the available energy once the main power supply has failed, the use of separate switches for short-circuiting the stator windings is thus to be preferred. The motor drive circuit according to the invention is pre-eminently suitable for use in combination with so-called hard disc drives. The use of the motor drive circuit, however, is not restricted to this application. Basically, the motor drive circuit is suitable for any use for which it is desirable in the case of a power failure to maintain the power supply to circuits for a brief period of time for carrying out necessary actions or operations.

We claim:

1. A motor drive circuit for driving an electromotor having a permanent magnet rotor and a stator comprising one or more stator windings, the motor drive circuit comprising: an excitation circuit for exciting the stator windings, a signal generation circuit for generating an emergency control signal which indicates a failure of the excitation of the stator windings, and an auxiliary power supply circuit for extracting electric energy from the motor in response to the emergency control signal and supplying the extracted energy to an auxiliary circuit, the auxiliary power supply circuit comprising a rectifier circuit coupled between at least one stator winding and the auxiliary circuit, a short-circuit means for short-circuiting the at least one stator winding coupled to the rectifier circuit, and a control means coupled to the short-circuit means for causing the at least one stator winding coupled to the rectifier circuit to be temporarily intermittently short-circuited.

2. A motor drive circuit as claimed in claim 1, wherein the control means controls the short-circuiting of the one stator winding in response to a voltage level of the energy supplied to the auxiliary circuit in a manner such that said voltage level remains substantially constant.

3. The motor drive circuit as claimed in claim 1, wherein the auxiliary power supply circuit is coupled to the short-circuiting means for supplying power to the short-circuiting means.

4. Data reading and/or recording apparatus comprising: a permanent magnet DC motor for rotatably driving a disc having a recording layer thereon, a magnetic read/write head arranged opposite the recording layer and movable in a radial direction relative to the disc, an actuator for moving the magnetic read/write head and a positioning control means for energizing the actuator, and a motor drive circuit for said DC motor comprising; an excitation circuit for exciting the stator windings, a signal generation circuit for generating an emergency control signal which indicates a failure of the excitation of the stator windings, and an auxiliary power supply circuit for extracting electric energy from the motor in response to the emergency control signal and supplying the extracted energy to said actuator, the auxiliary power supply circuit comprising a rectifier circuit coupled to at least one stator winding, a short-circuit means for intermittently short-circuiting the at least one stator winding in response to said emergency control signal, wherein the positioning control means receives its energy supply from the auxiliary power supply circuit, and wherein the positioning control means, via the actuator, causes the magnetic read/write head to be moved to an idle position in response to the emergency control signal.

5. A motor drive circuit for a motor having a rotor and a stator including one or more stator windings, the motor drive circuit comprising:

at least one voltage supply terminal, switching means coupled to said at least one voltage supply terminal and to said one or more stator windings, means for operating said switching means in a sequence so as to produce a rotating field in the motor that will interact with the rotor to rotate the motor, means for generating an emergency control signal when the voltage at the voltage supply terminal drops below a given voltage level, an auxiliary circuit adapted to be operated when the emergency control signal is generated, an auxiliary power supply circuit including a rectifier circuit coupled to at least one stator winding and the auxiliary circuit so that electric energy is transferred from the motor to the auxiliary circuit in response to the emergency control signal, and short-circuit means coupled to said at least one stator winding and controlled by said emergency control signal so as to intermittently short-circuit said at least one stator winding.

6. The motor drive circuit as claimed in claim 5 wherein the motor comprises at least a second stator winding coupled to said rectifier circuit and to said short-circuit means so as to be short-circuited intermittently when said emergency control signal is generated.

7. The motor drive circuit as claimed in claim 6 wherein said short-circuit means comprises first and second electronic controlled switched connected in parallel with respective ones of said stator windings.

8. The motor drive circuit as claimed in claim 5 further comprising:
   a storage capacitor coupled to said voltage supply terminal, said rectifier circuit and said auxiliary circuit, and
   control means operative when the emergency control signal is generated for controlling the short-circuit means as a function of the capacitor voltage level so as to hold said voltage level substantially constant.

9. The motor drive circuit as claimed in claim 5 wherein said auxiliary circuit comprises:
   an actuator for driving a magnetic head of a magnetic disc,
   position control means responsive to said emergency control signal for energizing the actuator to retract the magnetic head to a safe position upon the occurrence of the emergency control signal, and wherein
   said short circuit means includes at least one further switch which is separate and distinct from said switching means.

10. The motor drive circuit as claimed in claim 5 wherein said motor comprises a DC motor with a permanent magnet rotor and at least two stator windings, and
    said short-circuit means comprises first and second controlled switches coupled to respective ones of said stator windings whereby, when the emergency control signal is generated said first and second controlled switches are operated at different times.

11. The motor drive circuit as claimed in claim 5 wherein said motor comprises a DC motor with a permanent magnet rotor and at least two stator windings, and
    said short-circuit means comprises first and second controlled switched couples to respective ones of said stator windings, said switched being operated simultaneously.

12. The motor drive circuit as claimed in claim 11 wherein said first and second switches are connected in parallel with respective ones of said stator windings and are alternately opened and closed when the emergency control signal is generated.

13. The motor drive circuit as claimed in claim 5 wherein said emergency control signal generating means comprises a signal generator connected to said voltage supply terminal and responsive to the voltage thereat and said short-circuit means intermittently short-circuit said at least one stator winding when the emergency control signal is generated.

14. A motor drive circuit for a motor having a rotor and a stator including one or more stator windings, the motor drive circuit comprising:
    means for supplying an energizing voltage to said stator windings to operate the motor,
    means for generating an emergency control signal when the energizing voltage for said stator windings drops below a given voltage level,
    an auxiliary power supply circuit for extracting electric energy from the motor windings in response to the emergency control signal and supplying the extracted energy to an auxiliary circuit, the auxiliary power supply circuit comprising a rectifier circuit coupled between at least one stator winding and the auxiliary circuit, and
    short-circuit means coupled to said at least one stator winding and controlled by said emergency control signal so as to intermittently short-circuit said at least one stator winding thereby to derive from said one stator winding a relatively large voltage sufficient to operate said auxiliary circuit.

15. The motor drive circuit as claimed in claim 14 wherein said short-circuit means comprises a controlled switch connected in parallel with said at least one stator winding.

16. The motor drive circuit as claimed in claim 14 wherein said short-circuit means includes at-least one controlled switch which is a part of said energizing voltage supply means.

17. The motor drive circuit as claimed in claim 14 wherein the motor comprises at least a second stator winding coupled to said rectifier circuit and to said short-circuit means so as to be short-circuited intermittently when said emergency control signal is generated.

18. The motor drive circuit as claimed in claim 17 wherein said short-circuit means comprises first and second controlled switches coupled to respective ones of said stator windings.

19. The motor drive circuit as claimed in claim 18 wherein said first and second switches are connected in parallel with respective ones of said stator windings whereby a high voltage is generated in said stator windings.

20. The motor drive circuit as claimed in claim 19 wherein said auxiliary circuit comprises:
    an actuator controlled by said emergency control signal for driving a magnetic head of a magnetic recording device, and the motor drive circuit further comprises;
    a storage capacitor coupled to said auxiliary circuit and to said rectifier circuit so that, when the emergency control signal is present, the storage capacitor stores a high voltage generated in the stator windings.

\* \* \* \* \*

Disclaimer 5,495,372—Johannes P. M. Bahlmann; Henricus M. van Hout, both of Eindhoven, Netherlands. MOTOR DRIVE CIRCUIT WITH EMERGENCY AUXILIARY POWER SUPPLY ENERGIZED BY MOTOR. Patent dated February 27, 1996. Disclaimer filed June 24, 2008, by the assignee, U.S. Philips Corporation.

Hereby disclaims all of the claims of said patent.

*(Official Gazette September 30, 2008)*